R. C. FREEMAN & W. ROSSMAN.
WIND SHIELD ATTACHMENT.
APPLICATION FILED MAY 14, 1918.
1,282,801.
Patented Oct. 29, 1918.
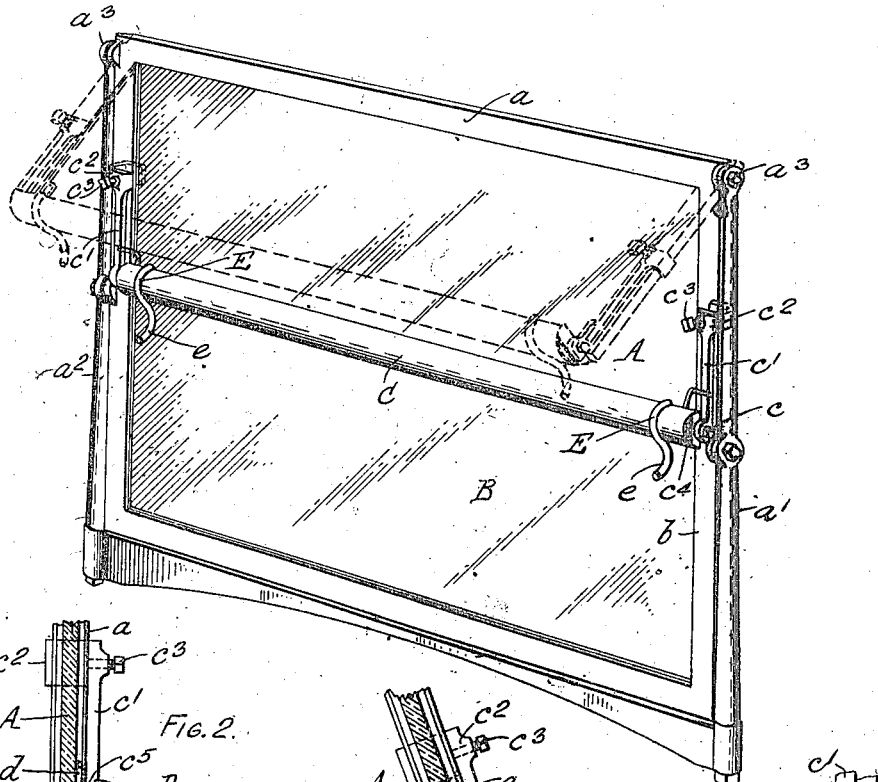
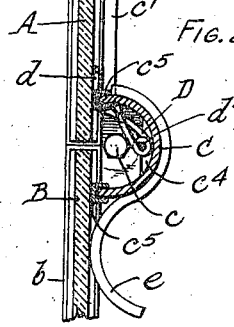
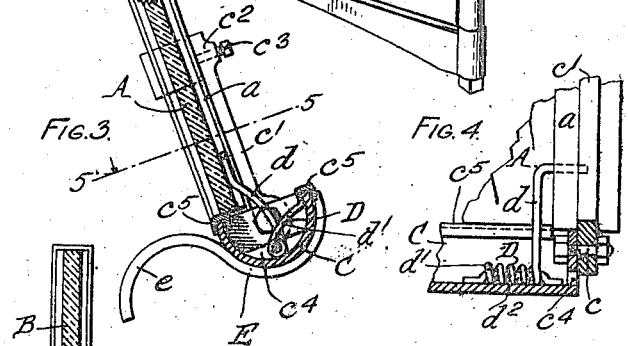
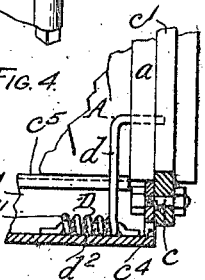
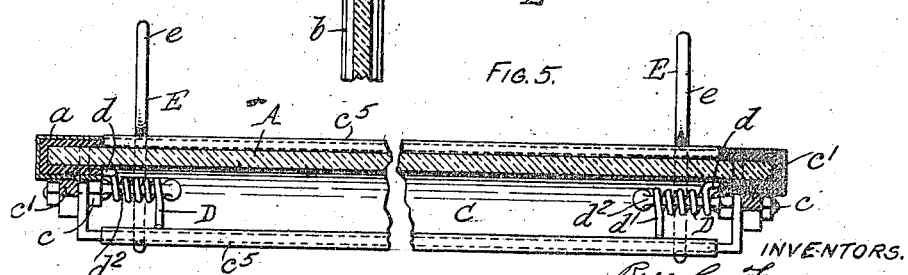
INVENTORS.
Ross C. Freeman
and William Rossman
By Wilhelm & Parker
ATTORNEYS.

UNITED STATES PATENT OFFICE.

ROSS C. FREEMAN AND WILLIAM ROSSMAN, OF BUFFALO, NEW YORK.

WIND-SHIELD ATTACHMENT.

1,282,801.  Specification of Letters Patent.  Patented Oct. 29, 1918.

Application filed May 14, 1918. Serial No. 234,484.

*To all whom it may concern:*

Be it known that we, Ross C. FREEMAN and WILLIAM ROSSMAN, citizens of the United States, residing at Buffalo, in the county of Erie and State of New York, have invented a new and useful Improvement in Wind-Shield Attachments, of which the following is a specification.

This invention relates to devices adapted to be attached to the lower edge of the upper portion or pane of an automobile windshield to prevent water from entering the automobile when the windshield is open or closed.

In driving an automobile in the rain with the upper portion of the windshield in the open or inclined position, water gathers in drops at the lower edge of the upper portion of the windshield and the vibration or jolting of the automobile, together with the wind, drives the drops into the interior of the automobile. When the windshield is closed, some water enters through the slot or groove between the upper and lower portions of the windshield.

The objects of the invention are to produce a device of simple and efficient construction for preventing water from entering the automobile and for discharging the water at the sides of the automobile; also to provide a device of this kind which can be moved into a position to close the slot between the upper and lower portions of the windshield when the same is closed; also to provide a device of this kind which will automatically move from one position to another; also to improve the construction of devices of this kind in the other respects hereinafter specified.

In the accompanying drawings:

Figure 1 is a perspective view of a windshield provided with an attachment embodying the invention for keeping water out of the automobile.

Fig. 2 is a fragmentary transverse sectional elevation thereof on an enlarged scale.

Fig. 3 is a similar view showing the windshield opened.

Fig. 4 is a fragmentary longitudinal sectional elevation thereof showing one end of the attachment.

Fig. 5 is a fragmentary sectional elevation thereof on line 5—5, Fig. 3.

The windshield to which this device is applied may be of any suitable or desired construction having upper and lower panes or portions A B which are provided with the usual metal frames $a$ $b$ extending around the edges of the windshield. The two portions of the windshield are mounted on the usual standards $a'$ $a^2$ suitably secured on the body of the vehicle. The upper portion of the windshield is preferably pivoted at $a^3$ so as to permit the lower part thereof to swing outwardly as indicated in dotted lines in Fig. 1.

The windshield attachment is preferably so constructed as to form a trough or channel at the bottom of the upper portion of the windshield when the same is open, and to be pressed against the two portions of the windshield to form a closure for the slot when the windshield is closed. For this purpose, in the construction shown in the drawings, a trough or channel-shaped member C is employed which is preferably pivoted at $c$ on supporting members $c'$ which are suitably secured to the frame or edge $a$ of the upper portion A of the windshield. The supporting members may be of any suitable or desired construction, each member shown in the drawings being provided with a clamp $c^2$ adapted to be adjustably secured on the upper windshield portion by a set screw $c^3$ or the like. The trough C, in the construction shown, is substantially semi-circular in cross-section and is adapted to extend throughout the width of the windshield and the ends thereof are partly closed and are provided with discharge openings or slots $c^4$ through which the water collecting in the trough can be readily discharged beyond the sides of the windshield. The edges of the trough are preferably provided with facing strips $c^5$ of rubber or other elastic material which are adapted to form a substantially watertight joint with the glass when pressed against the same.

The trough C is preferably actuated by means of a spring or the like to swing into the position shown in Fig. 3 when the windshield is open. In the construction shown, springs D are employed for this purpose which are secured to the trough and have an arm or part $d$ which is rigidly secured to the upper portion of the windshield, for example to the frame $a$ thereof, and an arm $d'$ which engages the trough C to cause the same to swing into the water-receiving position shown in Fig. 3. The intermediate portion of the spring is secured to the trough by means of a cleat or part $d^2$. A spring of any other construction may be employed.

Means are preferably provided for moving the trough into a position to close the slot between the two portions of the windshield when the upper portion of the windshield is moved to the closed position. In the construction shown for this purpose, a cam-shaped member or projection E is employed which is suitably secured to the trough and is provided with a curved member or part *e* which is so shaped as to cause the trough C to turn about its pivots against the action of the spring D into the position shown in Fig. 3. When the trough is in this position, the rubber-faced edges thereof will be tightly pressed against both the upper and lower portions of the windshield and will prevent water or wind from entering the automobile.

The attachment described is very efficient in preventing water from entering the body of the automobile when the windshield is open and also forms a substantially water-tight and air-tight closure for the slot in the windshield when the windshield is closed. The attachment automatically assumes one or the other position, depending upon the position of the upper portion of the windshield and can be readily attached to a windshield or removed therefrom.

I claim as my invention:

1. In a windshield having a lower portion, and an upper portion adapted to swing outwardly to form an opening in the windshield, the combination of a trough-shaped member mounted on said upper portion, means for yieldingly holding said trough-shaped member in a position to receive water from said upper portion of the windshield when said portion is swung outwardly, and means for moving said member into another position when said windshield is closed.

2. In a windshield having a lower portion, and an upper portion adapted to swing outwardly to form an opening in the windshield, the combination of a trough-shaped member mounted on said upper portion, means for yieldingly holding said trough-shaped member in a position to receive water from said upper portion of the windshield when said portion is swung outwardly, and means for swinging said member into a position to close the slot between said portions of the windshield when said upper portion is swung into the closed position.

3. In a windshield having a lower portion and an upper portion adapted to swing outwardly to form an opening in the windshield, the combination of a trough-shaped member mounted on said upper portion, means for yieldingly holding said trough-shaped member in a position to receive water from said upper portion of the windshield when said portion is swung outwardly, and a part adapted to engage said lower portion of the windshield to cause said trough-shaped member to swing into a position to close the slot between said portions of the windshield when said upper portion is swung into the closed position.

4. In a windshield having a lower portion, and an upper portion adapted to swing outwardly to form an opening in the windshield, the combination of a trough-shaped member mounted on said upper portion, means for yieldingly holding said trough-shaped member against the lower edge of said upper windshield portion when said portion is in the open position, and a part adapted to coöperate with said lower portion and said member to swing said member into a position to close the space between said portions when said upper portion is in the closed position.

5. In a windshield having a lower relatively fixed portion, and an upper portion adapted to swing outwardly to form an opening in the windshield, the combination of a member pivotally mounted on said upper portion, a spring for yieldingly holding said member against the lower edge of said upper portion of the windshield to collect water draining from said upper portion, and means for swinging said member about its pivots into a position to form a closure for the space between said portions of the windshield when said upper portion is moved to the closed position.

6. In a windshield having a lower relatively fixed portion, and an upper portion adapted to swing outwardly to form an opening in the windshield, the combination of a member pivotally mounted on said upper portion, a spring for yieldingly holding said member against the lower edge of said upper portion of the windshield to collect water draining from said upper portion, the edges of said member being faced with yielding material to form a substantially water-tight connection with said windshield portions, a spring for yieldingly holding one edge of said member against the lower edge of said upper windshield portion to enable said member to receive water from said upper portion, and means for swinging said member about its pivots when said upper portion is moved into its closed position to bring the faced edges of said member against the upper and lower windshield members to close the space between said members.

7. In a windshield having a lower portion, and an upper portion adapted to swing outwardly to form an opening in the windshield, the combination of a trough-shaped member mounted on said upper portion, means for yieldingly holding one edge of said trough-shaped member against the lower edge of said upper portion of the windshield when said portion is in the open position, and means adapted to engage said lower portion for swinging said member into a position in which the edges thereof engage said upper and lower portions of the windshield when the windshield is closed, whereby said member forms a closure for the space between the windshield portions.

8. In a windshield having a relatively fixed lower portion and an upper portion adapted to swing outwardly to form an opening in the windshield, the combination of a trough member, means for removably mounting said member on said upper portion of the windshield, means for yieldingly holding said member with one edge thereof against the lower edge of said upper portion, and means for moving said member relatively to said upper portion to form a closure for the space between said windshield portions when said upper portion is moved into its closed position.

Witness my hand, this 20th day of April, 1918.

ROSS C. FREEMAN.

Witnesses:
E. H. FREEMAN,
WM. H. WARDNER.

Witness my hand, this 30th day of April, 1918.

WILLIAM ROSSMAN.

Witness:
M. LeC. S. TUCKER.